June 14, 1932. C. N. MITCHELL 1,863,313
APPARATUS FOR WELDING TUBING
Filed Feb. 24, 1930   2 Sheets-Sheet 2
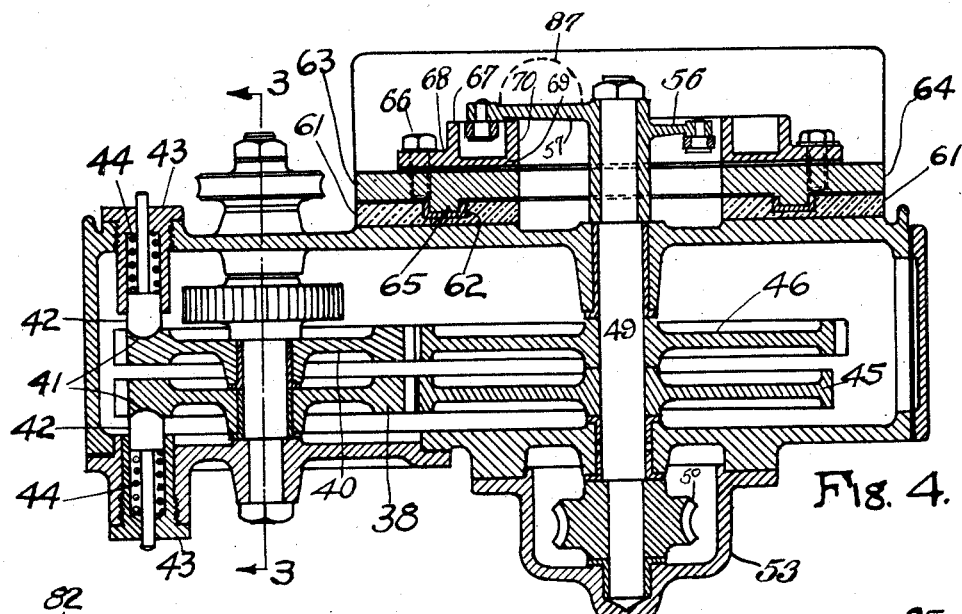
Fig. 4.
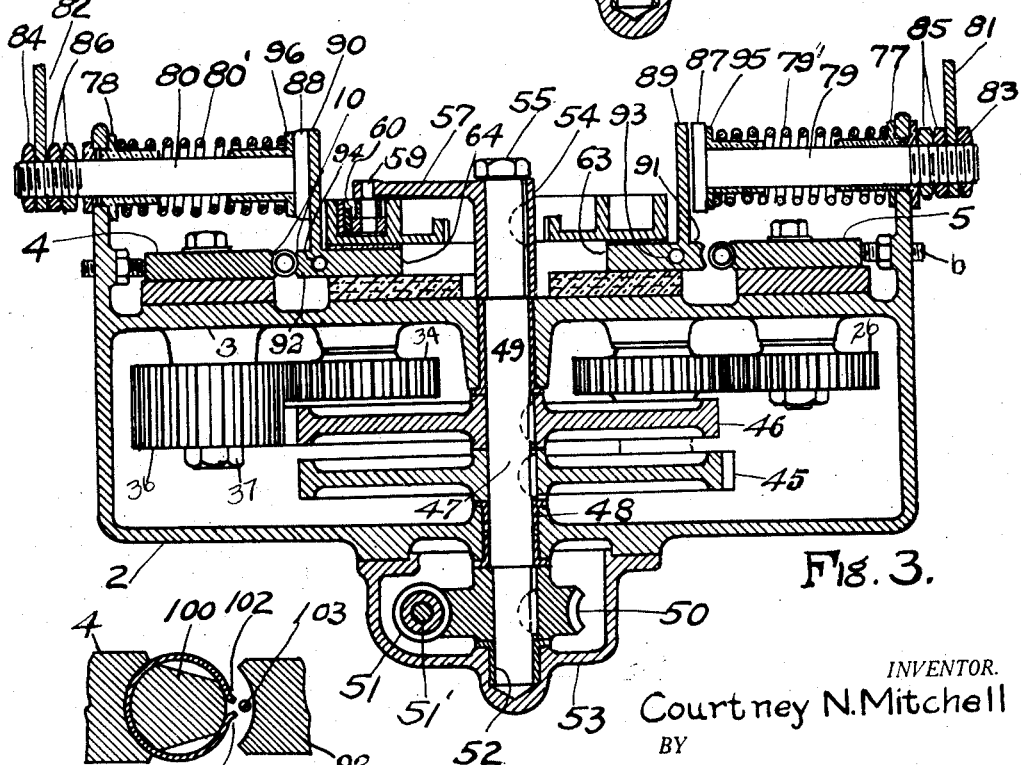
Fig. 3.
Fig. 5.
INVENTOR.
Courtney N. Mitchell
BY
Fay, Oberlin & Fay
ATTORNEYS.

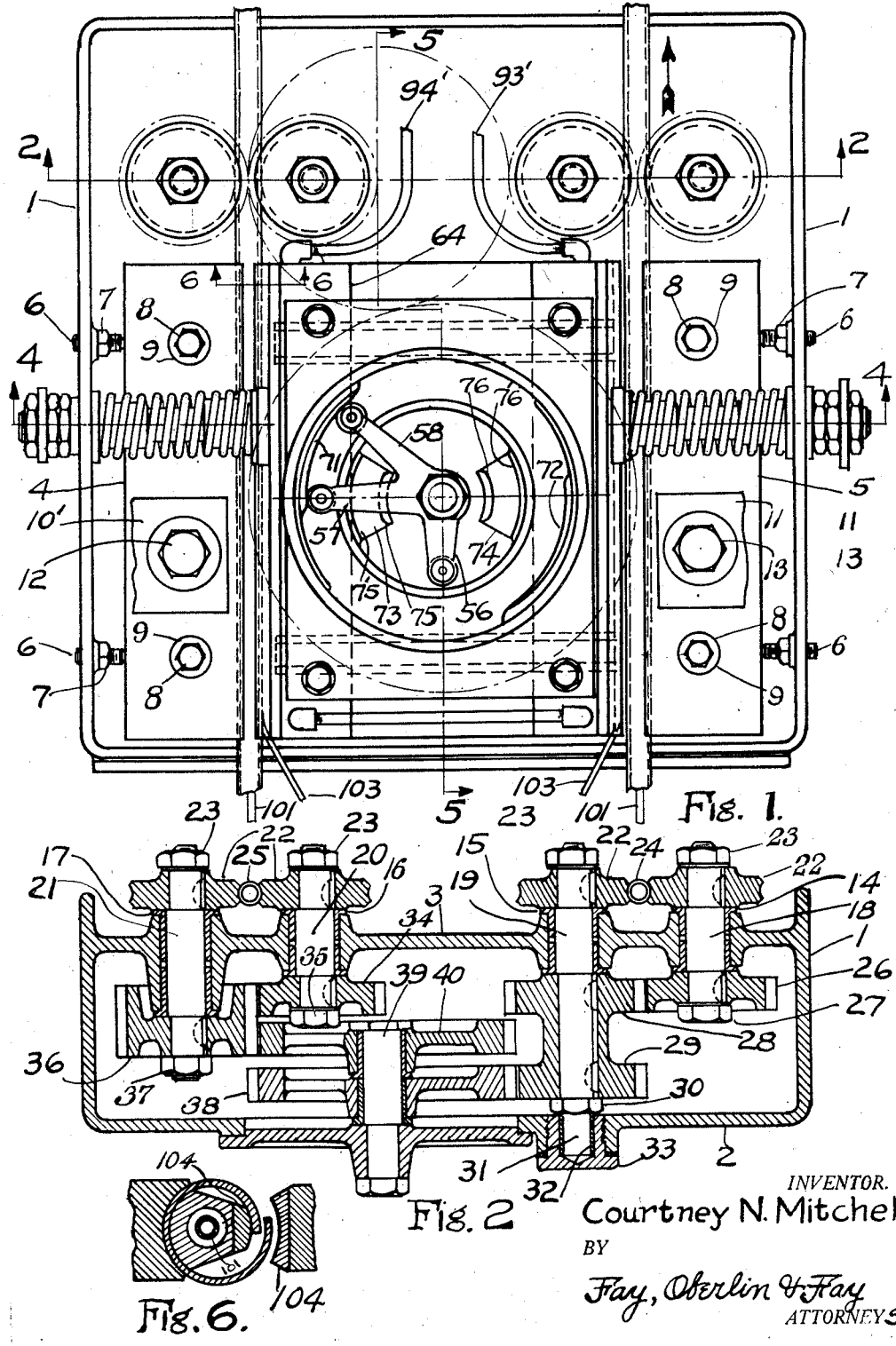

Patented June 14, 1932

1,863,313

UNITED STATES PATENT OFFICE

COURTNEY N. MITCHELL, OF CLEVELAND HEIGHTS, OHIO

APPARATUS FOR WELDING TUBING

Application filed February 24, 1930. Serial No. 430,693.

The present invention, relating as indicated to the welding of tubing, has specific reference to the manufacture of tubing which is superior in quality to tubing of the type now commonly made by the electric welding process and which can be made more rapidly than tubing of similar quality by processes now commonly employed.

In the formation of tubes from ribbon stock by forming such stock into cylindrical form having a longitudinal seam and then welded, such seam, to form the finished product, several well defined methods are now commonly employed. The butt welding of the contiguous edges of the longitudinal seams of tubes is chiefly founded on the principles disclosed in the patent granted to Otto Parpart, No. 658,741, on Sept. 25, 1900. The employment of the Parpart apparatus results in a weld, the microscopic structure of the metal of which is uniform throughout the length of the welded seam. The chief disadvantages in the weld obtained by the use of the Parpart apparatus is that a relatively large fin or burr is formed on either side of the seam during the welding process, which fin or burr must be removed by an additional operation in order to produce a tube having a smooth finish both interiorly and exteriorly.

For a considerable period of time the Parpart mechanism was used to weld tubing at a reasonable degree of speed with the undesirable fins or burrs formed on the tube during the welding process considered as a necessary evil to the attainment of welded tubes made at a relatively high speed. A further development in the art of welding tubing was evidenced by the patent granted to Johnston, No. 1,388,434, August 23, 1921, the apparatus disclosed in this patent being adapted to operate with a 60-cycle per second alternating current using from 12,000 to 15,000 amperes at one and one-half volts. The weld accomplished by the Johnston apparatus is what is commonly known as stitch welding and which produces a seam having a relatively small burr or fin associated therewith, but which has the undesirable characteristic of not being a truly continuous weld. In the weld accomplished by the Johnston apparatus an actual welding of the contiguous edges of the tube occurs only at spaced intervals and the joining of the metal intermediately of the stitches effected by the conductivity of the metal carrying the heat from the welded areas to the adjacent portions of the tube so that a joining of substantially the entire seam is effected.

A further milestone in the development of the art of welding tubes occurred in the issure of the patent to Pancoast, No. 1,544,272, on June 30, 1925. The patent to Pancoast set forth an apparatus which, in its basic principles of operation, was similar to the apparatus of Johnston. Pancoast, however, employed a high frequency current instead of the ordinary 60-cycle per second current employed by Johnston, and in using such high frequency current, brought the stitches comprising his welded seam closely enough together so that a welded seam resulted which was superior to the results obtained by Johnston. The product of the Pancoast apparatus, must still be considered as a stitch-welded seam having many of the undesirable features incidental in this type of welding. Pancoast likewise did not entirely get away from the formation of a burr or fin along the welded seam, which necessitated its removal by a separate operation subsequent to the welding.

There are many uses to which welded tubing is applied which require that the welded seam be formed entirely free from any burr or fin, and also that the metal forming the welded seam be homogeneous throughout its longitudinal extent so that material such as acid contained in the tubing will not cause a failure of the welded joint.

Regardless of the manner in which the stitch welding process is carried on there are numerous possibilities for a failure of such apparatus in producing welds of the proper consistency throughout the length of the seam, and such failure will then cause a weak spot in the tubing which makes it unsatisfactory for use where a weld of superior quality is absolutely demanded. The weld accomplished by the Parpart apparatus had the proper characteristics, so far as the consistency of the material forming the weld was concerned, but had the formation of a burr along the seam necessarily caused with the formation thereof so that such tubing could not be used for a number of purposes. It is an object of my invention to provide a method of welding tubing so as to form the closest approach to seamless tubes made by the well known process of piercing solid bars. It is a further object of this invention to provide a mechanism by which the above may be expeditiously carried out at a relatively low cost. The method and apparatus comprising this invention are equally applicable to the formation of a lap weld as well as a butt weld and the finished product resulting from each type of weld has superior qualities not found in any now commonly employed.

To the accomplishment of the foregoing and related ends, said invention then, consists of the means hereinafter fully described and particularly pointed out in the claims; the annexed drawings and the following description setting forth in detail certain means and one mode of carrying out the invention, such disclosed means and mode illustrating, however, but one of the various ways in which the principle of the invention may be used.

In said annexed drawings:—

Fig. 1 is a plan view of the mechanism comprising my invention; Fig. 2 is a transverse sectional elevation of the mechanism illustrated in Fig. 1 taken on a plane substantially indicated by the line 2—2; Fig. 3 is a transverse sectional elevation of the mechanism illustrated in Fig. 1 taken on a plane substantially indicated by the line 4—4; Fig. 4 is a longitudinal sectional view of the mechanism illustrated in Fig. 1 taken on the plane substantially indicated by the line 5—5; Fig. 5 is an enlarged fragmentary transverse sectional view of a portion of the mechanism illustrated in Fig. 1 taken on a plane substantially indicated by the line 6—6; and Fig. 6 is a fragmentary sectional view similar to Fig. 5 showing an alternative form of construction.

Referring more specifically to the drawings, and more especially to Fig. 1 and other figures in which like ordinals are employed to designate like parts, 1 designates the sides of the main supporting frame for the mechanism which extends upwardly from the bottom portion 2, and which is intermediately supported by the cross member 3. The cross member 3 has secured thereto substantially rectangular electrodes 4 and 5 which are laterally adjustable by means of screws 6, which are threadably engaged by the side frames 1 and locked thereto by nuts 7. The electrodes 4 and 5 are rigidly secured in their adjusted position to the base 3 by means of bolts 8 which have washers 9 interposed between the heads thereof and the body of the electrodes so that the portions of such electrodes contiguous to the sides of the slotted holes (not shown) are properly engaged to rigidly secure the electrodes 4 and 5 in any of the several positions. The longitudinal inner faces of the electrodes 4 and 5 are formed with substantially semi-circular grooves 10 adapted to engage the outer periphery of the tube to be acted upon. The electrodes 4 and 5 have respectively secured thereto leads 10' and 11 by means of bolts 12 and 13.

The web 3 of the supporting base, as most clearly shown in Fig. 2, is adapted to receive the bearings 14, 15, 16 and 17, in which are respectively journaled the shafts 18, 19, 20 and 21. These shafts have keyed thereto draft wheels 22 which are axially secured to their respective shafts by nuts 23. The peripheries of the draft wheels 22 are formed to engage the outer surfaces of tubes 24 and 25. The shaft 18 has a gear wheel 26 keyed thereto, and which is axially restrained by a nut 27. The gear 26 meshes with a gear 28 which is keyed to the shaft 19 and which has integrally formed therewith another gear wheel 29. The gears 28 and 29 are axially restrained on the shaft 19 by a nut 30 and the shaft 19 is terminally journaled at 31 in a bearing 32 carried by a removable cap 33 which threadably engages the base 2 of the supporting frame.

The shaft 20 has keyed thereto a gear 34 which is axially restrained by the nut 35 and which meshes with a gear 36 of substantial width. The gear 36 is keyed to the shaft 21 and axially restrained thereto by the nut 37. The gear 29 meshes with a gear 38 which is revolubly mounted on a shaft 39 and the gear 36 meshes with a gear 40, which is likewise revolubly mounted on the shaft 39. The gears 38 and 40 have substantially semi-spherical indentations 41 formed therein which are adapted to be engaged by the similarly formed terminal portions of plungers 42 which are slidably mounted in retaining caps 43, and which have springs 44 associated therewith to maintain contact between the members 42 and the gears 38 and 40.

The gears 38 and 40 respectively mesh with gears 45 and 46 which are keyed to a shaft 47. The gears 45 and 46 are provided with teeth on a little less than one-half of their outer periphery so that the gears 38 and 40 are respectively driven only intermittently thereby for the reasons hereinafter fully explained. The shaft 47 is journaled in a bearing 48 carried by the base 2 of the frame and is likewise journaled in a bearing 49 carried by the web 3 of the supporting base. Rigidly keyed to the shaft 47 is a worm gear 50 which meshes with a worm 51 rigidly secured to a drive shaft 51', which drive shaft is driven by a motor (not shown). The shaft 47 is terminally supported in a bearing 52 carried by the removable cap 53 which houses the worm gear drive.

Terminally keyed to the shaft 47 is a sleeve 54 which is axially restrained thereto by means of a nut 55. The sleeve 54 has integrally formed therewith a plurality of radially extending arms 56, 57 and 58. Terminally carried by the arms 56, 57 and 58 are pins 59, on which are revolubly mounted rollers 60. It will be noted in connection with the description of the arms 56, 57 and 58, which are most clearly shown in Fig. 1, that the rollers terminally carried thereby are similarly mounted so that the description in connection with Fig. 3, which shows the arm 57 in section, will suffice for all three of these arms.

The web 3 of the supporting frame has a block of insulating material 61 rigidly secured thereto, which insulating material has embedded therein channel shaped bearing members 62 which, as indicated in Fig. 1, extend in a direction substantially transversely of the mechanism. Mounted on the insulating material 61 are longitudinally extending members 63 and 64 which have integrally formed therewith on their lower surfaces projections 65 adapted to engage and slide in the channel shaped bearing members 62. Rigidly secured to the members 63 and 64, by means of the bolts 66, is a member having a central cylindrical portion 67 formed with a laterally extending flange 68. The flange 68 bridges the members 63 and 64 and maintains the same in proper spaced relation. The flange 68 extends inwardly of the cylindrical portion as at 69 and has another cylindrical portion 70 formed integrally therewith and extending upwardly therefrom. Rigidly secured to the inner periphery of the cylindrical member 67 are cam members 71 and 72, and similarly secured to the inner periphery of the cylindrical body 70 are segmental radially extending inwardly directed members 73 and 74, which carry cam faces 75, 76, 75' and 76'.

Slidably mounted in sleeves 77 and 78, which are formed of insulating material and are rigidly secured to the opposite upwardly extending side frames 1 are shafts 79 and 80, which have respectively terminally secured thereto leads 81 and 82 by means of nuts 83 and 84 and lock nuts 85 and 86. The other terminal portion of the shafts 79 and 80 are formed into enlarged heads 87 and 88 adapted to respectively contact with the upwardly extending flanges 89 and 90 formed integrally with the longitudinally extending members 63 and 64. The shafts 79 and 80 have coaxially mounted thereon springs 79' and 80', which springs respectively terminally engage the insulated sleeves 77 and 78 and insulated collars 95 and 96 so as to maintain the shafts 79 and 80 in their innermost positions, as indicated by the position of the shaft 79 in Fig. 3. The members 63 and 64 have projecting laterally therefrom longitudinally extending elements 91 and 92 which are terminally adapted to engage the outer periphery of the tube to be welded. Members 63 and 64 likewise have longitudinal fluid ducts 93 and 94 extending therethrough, which ducts are adapted to convey a suitable cooling medium which is supplied thereto by means of the conduits 93' and 94'. The operation of the mechanism will now be briefly described.

The entire mechanism, as hereinbefore explained, is driven by the worm 51 meshing with the worm gear 50, which drives the vertically disposed shaft 47. A rotation of the shaft 47 carries with it the gear wheels 45 and 46 and also the arms 56, 57 and 58. The rotation of these arms, which carry the rollers 60 on their ends, causes such rollers to contact with the cam faces 71, 72, 75, 75', 76 and 76' so that the longitudinally extending members 63 and 64 are moved from one side to the other on the insulated bed of the machine, and as such members 63 and 64 are moved from side to side they contact, first with the tube carried in one side of the machine, and then, upon being moved over, contact with the tube carried by the other side of the machine. As the member 64 is moved to the left, as illustrated in Fig. 3, contact is established between the flange 90 and the enlarged head 88 of the rod 80, which is terminally connected to the electric lead 82. Similarly, when the member 63 is moved to the right, as illustrated in Fig. 3 electrical contact is established between the enlarged head 87 of the rod 79 and the flange 89, which is formed integrally with the member 63. In this manner the welding circuit for the tube 24 is closed when the member 63 is moved over into welding position.

The gears 45 and 46, which respectively drive the draft rolls for the tubes 24 and 25, as before explained, are formed with teeth on their outer peripheries for only a little less than one-half of their circumference. For each complete revolution of the gears 45 and 46 therefor driving communication is established with the gears 38 and 40 through only one-half of each such revolution of the shaft 47 when the member 63 is retracted from the tube, as illustrated in Fig. 3. The gear 45, driving the gear 38, therefore moves the tube which has just been welded for a distance slightly less than the length of the member 63. The movement of the tube 24 positions a fresh unwelded portion of such tube in proper relationship to the members 5 and 63 so that when the member 63 is moved to the right during the next half rotation of the shaft 47 this newly introduced portion of the tube 24 will be welded as a unit.

During the one-half revolution in which the members 63 or 64 are in contact with the tube to be welded, the blank circumference of the gears 45 or 46 will be opposite the gears 38 and 40, respectively, so that no longitudinal movement of the tube is effected during the welding operation. The formation of the cam faces 71 and 72 is such that during the early period of the welding operation for each section of tubing the welding electrodes 63 and 64 are moved into arcing relation with respect to the tube, which arcing heats the tube to the welding temperature, whereupon the roller carried by the arm 58 moves into the upper surface of the cam faces 71 or 72 so that the electrodes are moved into upsetting relationship with respect to the seam to be welded. The follower arm 57 maintains the electrodes in such upsetting relationship for a period of time sufficient to accomplish a proper welding of the seam. When the roller carried by the arm 57 passes off from the end of the cam 71 the roller carried by the arm 56 engages the cam face 75 and pulls the electrode 64 away from the tube which has just been welded, and by pulling away such electrode the contact is broken between the members 88 and 90. In connection with the description of these contactors, it should be noted that the current thereto may be supplied through a submerged switch, which may be actuated by a cam interconnected with the shaft 47 so that the welding current is disrupted by means of such switch immediately previous to the retraction of the electrode from the work. The employment of such switch would prevent any arcing in the mechanism should it be found that such arcing was sufficient to interfere with the operation of the device.

As most clearly indicated in Figs. 5 and 6, the tube to be welded is supported on its inner periphery by means of an electrode block 100 which is axially restrained in the tube by means of anchor rods 101, which are secured to a rigid member (not shown). The electrode block 100 and the electrodes 91 and 92 may be faced with a suitable heat resisting and current conducting alloy 104, such as tungsten-copper alloy, which provides a contact having superior qualities than the ordinary material from which such elements are commonly constructed. As illustrated in Fig. 6, the supporting rod 101 for the electrode block 100 may be in the form of a hollow tube which may be employed to introduce a suitable cooling medium to the electrode block.

When a butt joint is to be welded, as shown in Fig. 5, the contiguous edges of said joint or seam cleft may be slightly bent downwardly as at 102 and a wire or other auxiliary welding material, as at 103, introduced into the seam cleft, which material insures the proper formation of the welded seam.

As most clearly illustrated in Fig. 6, the mechanism comprising my invention is also applicable to the welding of lap seams, and when such seams are to be welded the tube will occupy the position shown in this figure as such tube is positioned between the electrodes prior to the welding operation.

In connection with the description of the electrodes 63 and 64, instead of using a longitudinally extending electrode as I have shown in the accompanying drawings for the purpose of illustration I may prefer to use a rotatable electrode mounted on longitudinally movable means so that a rolling contact is established between the welding electrode and the seam cleft instead of plain pressure contact as hereinbefore described. In connection with the current employed by the mechanism comprising my invention it will be noted that either direct or alternating current can be used to like advantage so long as the proper relationship between its potential and current is maintained.

A further description of the method and apparatus comprising my invention is deemed unnecessary for those familiar with the art, suffice it to say that I have described only so much of the mechanism as is believed essential to the operation thereof and to the accomplishment of the desired ends comprising the method of my invention. It should be further noted that numerous detail changes may be made in the actual construction of the mechanism without departing from the principles of this invention.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. In a mechanism for welding longitudinal seams, the combination with a fixed electrode, of means for intermittently moving the material to be welded across the face of said electrode, a movable electrode, means adapted to intermittently move said last-named electrode into welding relationship with said material, and means adapted to engage said movable electrode for supplying a welding current thereto during its engagement with the work to be welded.

2. In a mechanism for welding longitudinal seams, the combination with a fixed electrode, of means for intermittently moving the material to be welded across the face of said electrode, a movable electrode, means for introducing auxiliary welding material to the seam cleft, and means adapted to intermittently move said last-named electrode into welding relationship with said material.

3. In a welding mechanism, the combination with a pair of fixed electrodes, of means adapted to intermittently move a separate seam cleft across each of said electrodes, a pair of movable electrodes, and means adapted to intermittently effect welding engagement between said movable electrodes and said seam clefts.

4. In a welding mechanism, the combination with a pair of fixed electrodes, of means adapted to intermittently and alternately move separate seam clefts across the respective electrodes, a pair of movable electrodes, and means adapted to intermittently and alternately effect welding engagement between said movable electrodes and said seam clefts.

5. In a welding mechanism, the combination with a pair of fixed electrodes, of means adapted to intermittently move a separate seam cleft across each of said electrodes, a pair of movable electrodes, means for introducing auxiliary welding material to said seam clefts, and means adapted to intermittently effect welding engagement between said movable electrodes and said seam clefts.

6. In a welding mechanism, the combination with a pair of fixed electrodes, of means adapted to intermittently move a separate seam cleft across each of said electrodes, a pair of interconnected movable electrodes adapted to alternately contact with the seam clefts on said fixed electrodes, and means associated with said seam moving means adapted to effect welding contact with one of said movable electrodes and the stationary seam cleft on said fixed electrodes.

7. In a mechanism for simultaneously welding the seam clefts in a pair of tubes, the combination with a pair of spaced oppositely facing electrodes, of means for intermittently and alternately moving each of said tubes axially and contiguous to said electrodes, means adapted to engage the inner peripheries of said tubes, a pair of spaced oppositely facing movable electrodes adapted to intermittently and alternately engage the seam clefts of said tubes, and means associated with said tube moving means for intermittently moving said movable electrodes into welding engagement with said tubes.

Signed by me this 21st day of February, 1930.

COURTNEY N. MITCHELL.